United States Patent
Gregersen et al.

(10) Patent No.: US 7,707,064 B2
(45) Date of Patent: Apr. 27, 2010

(54) RFID RECEIVING PROCESS FOR USE WITH ENTERPRISE RESOURCE PLANNING SYSTEMS

(75) Inventors: Flemming Gregersen, Hilleroed (DK); Kenneth Puggaard, Frederikssund (DK); Thomas Vest, Roenne (DK)

(73) Assignee: Microsoft Corporation, Redmond, WA (US)

( * ) Notice: Subject to any disclaimer, the term of this patent is extended or adjusted under 35 U.S.C. 154(b) by 731 days.

(21) Appl. No.: 11/101,062

(22) Filed: Apr. 7, 2005

(65) Prior Publication Data

US 2006/0253343 A1 Nov. 9, 2006

(51) Int. Cl.
G06G 1/14 (2006.01)
G06Q 10/00 (2006.01)
G08B 13/14 (2006.01)
(52) U.S. Cl. .................. 705/22; 705/28; 340/572.1
(58) Field of Classification Search .............. 705/22; 340/572.1
See application file for complete search history.

(56) References Cited

U.S. PATENT DOCUMENTS

| | | | | |
|---|---|---|---|---|
| 7,012,529 B2 * | 3/2006 | Sajkowsky | ............... | 340/572.1 |
| 7,091,861 B2 * | 8/2006 | Schmidtberg et al. | ..... | 340/572.1 |
| 7,096,151 B2 * | 8/2006 | Klein | ............... | 702/173 |
| 2004/0254842 A1 * | 12/2004 | Kirkegaard | ............... | 705/22 |

OTHER PUBLICATIONS

Search Report and Written Opinion dated Jan. 31, 2008 from International application No. PCT/US06/09573, filed Mar. 16, 2006.
"Microsoft Business Solutions—Axapta" Aug. 1, 2003.
"Microsoft Business Solutions—Axapta 3.0 Quick Reference Guide", 2004.

* cited by examiner

*Primary Examiner*—F. Ryan Zeender
*Assistant Examiner*—Fahd A Obeid
(74) *Attorney, Agent, or Firm*—Westman, Champlin & Kelly, P.A.

(57) ABSTRACT

A Radio Frequency Identification (RFID) receiving method for use with an Enterprise Resource Planning (ERP) system is provided. The method includes reading, at a receiving point, information from RFID tags included on delivered items, which are not recorded on an Advanced Shipment Notification (ASN). An item arrival journal including item arrival lines is generated. By calling a mapping form, the item arrival lines are displayed along with RFID tag information indicative of delivered items. Then, mapping form logic is used to automatically map at least some of the delivered items corresponding to the RFID tags to item arrival lines to thereby match delivered items with ordered items.

12 Claims, 9 Drawing Sheets

RFID RECEIVING PROCESS FOR USE WITH ENTERPRISE RESOURCE PLANNING SYSTEMS

BACKGROUND OF THE INVENTION

The present invention relates to Enterprise Resource Planning (ERP) systems. In particular, the present invention relates to methods and systems for utilizing Radio Frequency Identification (RFID) tags with ERP systems.

Enterprise resource planning (or ERP) is a phrase used to describe a broad set of activities supported by multi-module application software that helps a manufacturer or other business manage the important parts of its business, including product planning, parts purchasing, maintaining inventories, order tracking, interacting with suppliers, providing customer service, finance, human resources, etc. Often, an ERP system uses or is integrated with a relational database system. An example of an ERP system is Microsoft® Business Solutions-Axapta®. Axapta provides functionality to support many needs of a business, for example including: manufacturing; distribution, supply chain management, project management, financial management, human resource management, business analysis, enterprise portal, commerce gateway, etc.

There is an ongoing effort to introduce transmitters, such as RFID tags, into consumer goods. In particular, RFID tags are being used to identify products. An RFID tag is energized when it is placed in the proximity of an RFID tag reader. This causes circuitry within the RFID tag to transmit digital data which is received by the tag reader and stored in memory. The data can be used to identify the goods associated with the RFID tag. RFID tags can be placed on the individual goods themselves, and/or they can be placed on pallets or containers used to ship the goods. Ideally, RFID tags can be used to assist in automating the inventory and supply chain processes.

With a wide range of capabilities, RFID tags are a growing area in tracking technology. Unlike barcodes, RFID tags can be read through thick packaging and are unaffected by moisture and heat making them highly effective in manufacturing and distribution environments. RFID tags enable automatic identification with no physical contact. Depending on the specific type of RFID tag employed, the read range extends from a few inches to hundreds of feet.

In general terms, RFID is a means of identifying an object using a radio frequency transmission, typically 125 kHz, 13.56 MHz or 800-900 MHz. RFID has been extensively used in applications such as toll collection, access control, ticketing, and car immobilization devices (also called immobilizers). In recent years, the technology has received increased attention due to a confluence of actions including technology advancement, heightened security concerns, supply chain automation, and a continuing emphasis on cost control within industrial systems.

The AIDC (Automatic Identification Data Capture) industry is moving rapidly towards the use of RFID in a number of high-value and high-volume market segments. The primary benefit of RFID tags over barcodes is their ease of use and reliability. RFID tags can be read or written at distances up to several feet, while in motion, in any orientation, regardless of dirt or smudges, and through intervening objects. Perhaps most significant is the fact that many RFID tags can be read at once automatically, while barcodes have to be scanned manually, one by one.

An RFID tag will only communicate when it is in range of a read/write device (a transceiver, a transmitter/receiver, or a reader) and can be accessed at anytime. RFID tags are durable and have a long life span, no battery requirement with most tag types, and large data memory capacity. RFID tags are available in a variety of different shapes and sizes.

In construction an RFID tag has a microchip attached to an antenna. RFID tags are developed using a frequency according to the needs of the system including read range and the environment in which the tag will be read. Tags are either active or passive. Active RFID tags are powered by an internal battery and are typically read/write devices. Active RFID tags are more expensive and larger than passive RFID tags. However, they are also more powerful and have a greater read range. Passive RFID tags are powered by the field generated by the reader. Passive tags are typically much lighter than active tags, less expensive, and offer a virtually unlimited operational lifetime. However, they have shorter read ranges and require a higher-powered reader than active tags.

An RFID reader, usually connected to a personal computer, serves the same purpose as a barcode scanner. It can also be battery-powered to allow mobile transactions with RFID tags. The RFID reader handles the communication between the information system and the RFID tag. An RFID antenna connected to the RFID reader, can be of various sizes and structures, depending on the communication distance required for a given system's performance. The antenna activates the RFID tag and transfers data by emitting wireless pulses.

While RFID tags can be used to collect additional data related to a supply chain process, fully using this data can present problems, particularly in existing ERP systems. For example, while an RFID tag can provide information which identifies the particular goods associated with the tag, it does not provide information which would allow a purchaser to know which of multiple like or identical products a particular received item corresponds to. For instance, in a supply chain when a manufacturer regularly orders (through purchase orders) the same item, when a shipment including a pallet containing that item arrives, if an Advanced Shipment Notification (ASN) is not received as well, it is not readily apparent which purchase order the received item corresponds to. Other obstacles exist which may prevent the RFID tag information from being fully utilized to improve the process.

SUMMARY OF THE INVENTION

Using RFID tags to streamline business processes requires integration the information into business software such that the information is useful as will as is not disruptive to the existing functionality of the software. The invention provides formats, schemas and processes to enter the information into business software supply chain and inventory control software without affecting other functionality.

A Radio Frequency Identification (RFID) receiving method for use with an Enterprise Resource Planning (ERP) system is provided. The method includes reading, at a receiving point, information from RFID tags included on delivered items, which are not recorded on an Advanced Shipment Notification (ASN). An item arrival journal including item arrival lines is generated. By calling a mapping form, the item arrival lines are displayed along with RFID tag information indicative of delivered items. Then, mapping form logic is used to automatically map at least some of the delivered items corresponding to the RFID tags to item arrival lines to thereby match delivered items with ordered items.

Other features and benefits that characterize embodiments of the present invention will be apparent upon reading the following detailed description and review of the associated drawings.

DETAILED DESCRIPTION OF ILLUSTRATIVE EMBODIMENTS

Radio frequency identification (RFID) is a technology which can aid manufacturers and distributors to gain improved visibility into their supply chain, by increasing the number of data capture points in their supply chain. The aim is to put RFID tags on pallets, cases or items so they can be uniquely identified and tracked in the supply chain. The tracking can be done by collecting the data about when a unique pallet/case/item was registered at a specific location. This data can then be collected by an RFID middleware application (an RFID server) and fed to an ERP system, where it will be processed accordingly using methods of the present invention.

By introducing RFID into ERP systems such as Axapta®, processes related to receiving and shipping items and pallets will be more streamlined and optimized. Using RFID tags to streamline business processes requires integrating the information into business software such that the information is useful as well as is not disruptive to the existing functionality of the software. The present invention provides formats, schemas and processes to enter the information into business software supply chain and inventory control software without affecting other functionality.

Figure 1:
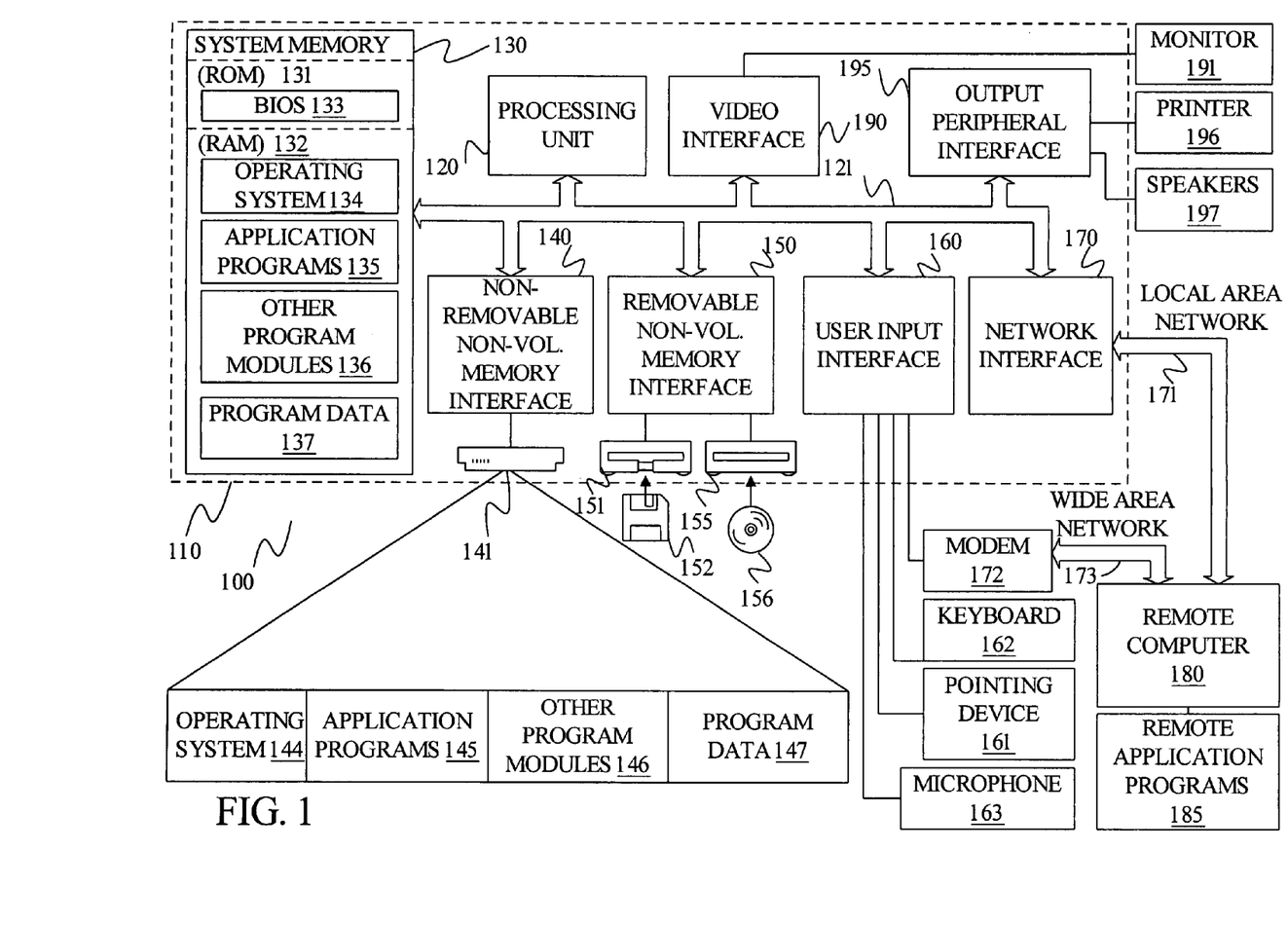
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
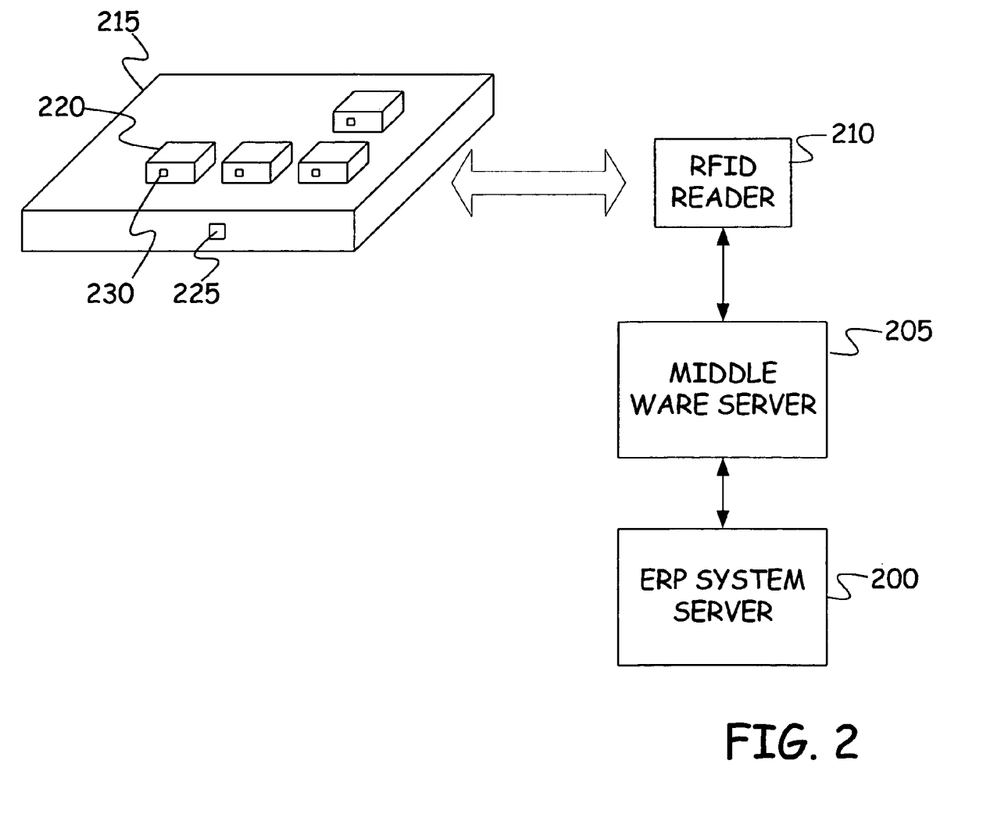
FIG. 2 is a block diagram of an environment in which methods of the present invention can be implemented.

Referring now to FIG. 2, shown in block diagram is an environment in which the methods of the present invention can be implemented. In FIG. 2, ERP system server 200 represents one or more servers or computing systems on which ERP system modules are run to implement ERP functions for a company or user. A middleware server 205 couples ERP system server to an RFID reader device 210. Middleware server 205 interfaces with RFID reader 210, and in some embodiments controls the functions of RFID reader.

Pallet 215 represents a container on which, or in which, goods or items 220 are received in response to one or more purchase orders. An RFID tag 225 is, in some embodiments, secured to pallet 215 for identification purposes. In these or other embodiments, the individual goods or items 220 also each have their own RFID tag 230. Under the control of middleware server 205, RFID reader 210 transmits electromagnetic signals toward RFID tags 225 and 230 in order to elicit a response signal from the tags. Tags 225 and 230 can be any desired type of RFID tag, including inductively coupled RFID tags, capacitively coupled RFID tags, battery powered RFID tags, etc. In some well known embodiments of RFID tags, the inductively or capacitively coupled RFID tags are powered by the magnetic field generated by the reader. An integral antenna on the tag receives the magnetic energy, and the tag communicates with the reader using RF communication. The tag modulates the magnetic field in order to retrieve and transmit data back to the reader 210 and to middleware server 205. The data encrypted on the RFID tag, which is retrieved and transmitted back to the RFID reader 210, includes information indicative of the source or manufacturer of the item(s), a product code for the item(s), serial numbers for the item(s), etc. In some embodiments, this information is stored on middleware server 205.

Figure 3:
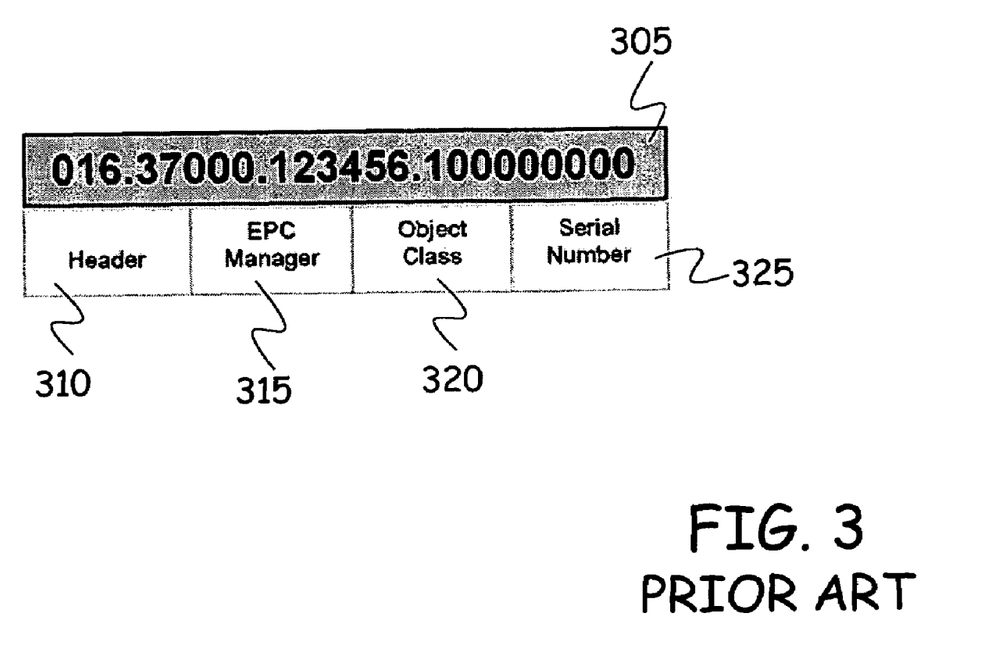
FIG. 3 is a diagrammatic illustration showing an example Electronic Product Code (EPC) number.

In exemplary embodiments, the information read from the RFID tags is encrypted with an Electronic Product Code (EPC) number. The EPC is a product identification standard established by EPCglobal in an attempt to unify and standardize product identification techniques. The EPC is built around a basic hierarchical idea that can be used to express a wide variety of different, existing numbering systems. The EPC is divided into numbers that identify the manufacturer and product type. The EPC can also use extra digits, for a serial number, to identify unique items. An example EPC number is 305 is shown in FIG. 3. While the present invention is not limited to this or any specific EPC configuration, for illustrative purposes, the EPC number shown in FIG. 3 contains:

1. Header 310, which identifies the length, type, structure, version and generation of the EPC;
2. Manager Number 315, which identifies the company or company entity;

3. Object Class 320, which is similar to a stock keeping unit or SKU (the object class is, or includes, the Global Trading Identification Number or GTIN); and
4. Serial Number 325, which is the specific instance of the Object Class being tagged.

Additional fields may also be used as part of the EPC in order to properly encode and decode information from different numbering systems into their native (human-readable) forms.

Figure 4:
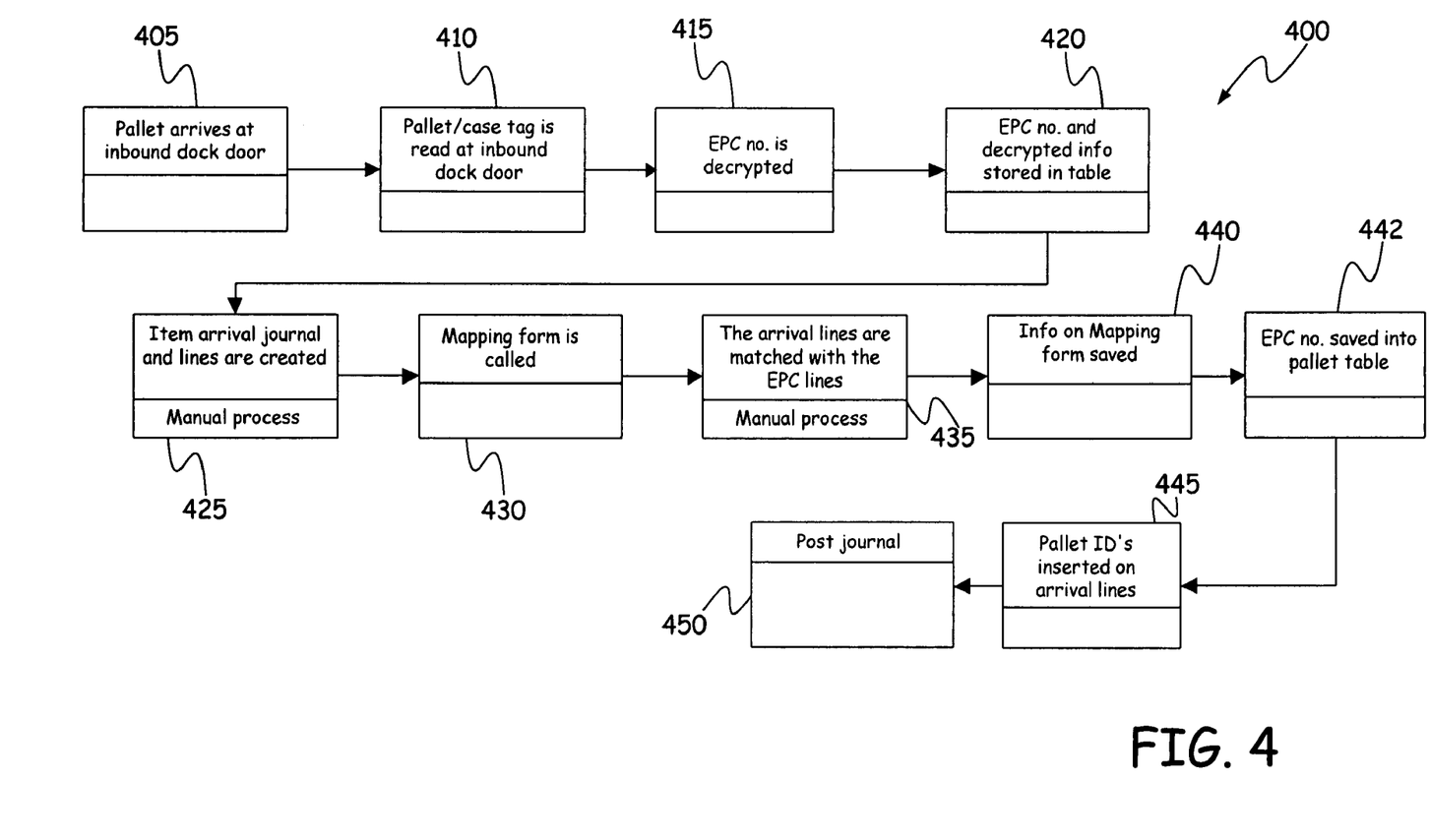
FIG. 4 is a diagrammatic illustration of a Radio Frequency Identification (RFID) receive process, used with an Enterprise Resource Planning (ERP) system, in accordance with an embodiment of the present invention.

Referring now to FIG. 4, shown is a receive process 400 for receiving pallets, cases or other containers tagged with an EPC number which is encoded or encrypted on an RFID tag, and linking the information from the individual tags to an ERP system 200, for example such as Axapta inventory transactions. The process 400 is particularly applicable to situations where an Advanced Shipment Notification (ASN) is not received. Advanced shipment notifications are used to notify a customer of a shipment. An ASN will often include purchase order (PO) numbers, stock keeping unit (SKU) numbers, lot numbers, quantity, and pallet or container number information. Without an ASN, tracking the goods or items received against those ordered can be a difficult task. There are two strings to the flow of process 400, one regarding tag read, and one regarding ERP system registration.

First the tag read steps are described. As illustrated at 405 in FIG. 4, a pallet or other type of container is delivered to a receiving point, typically an inbound dock door. At step 410, the RFID tag(s) from the pallet or container, and/or those from any smaller units of goods or items on the pallet or in the container, are read using an RFID reader. Then, from the tag read, the EPC number is identified and decrypted to obtain the information contained in the EPC number. This is illustrated at step 415. The decrypted information can include, for example, the Global Trading Identification Number (GTIN), such as illustrated at 320 in FIG. 3. GTIN numbers (and other information stored in the EPC numbers) of the received goods have to be extracted from the EPC numbers in the tags. Generally, the Serial Shipping Container Code (SSCC) portion of the EPC is not applicable to this process in most embodiments. This assumes that the relevant GTIN numbers already exist in the ERP system database(s). Next, as shown at step 420, the extracted information is stored in an EPC table.

Figure 5:
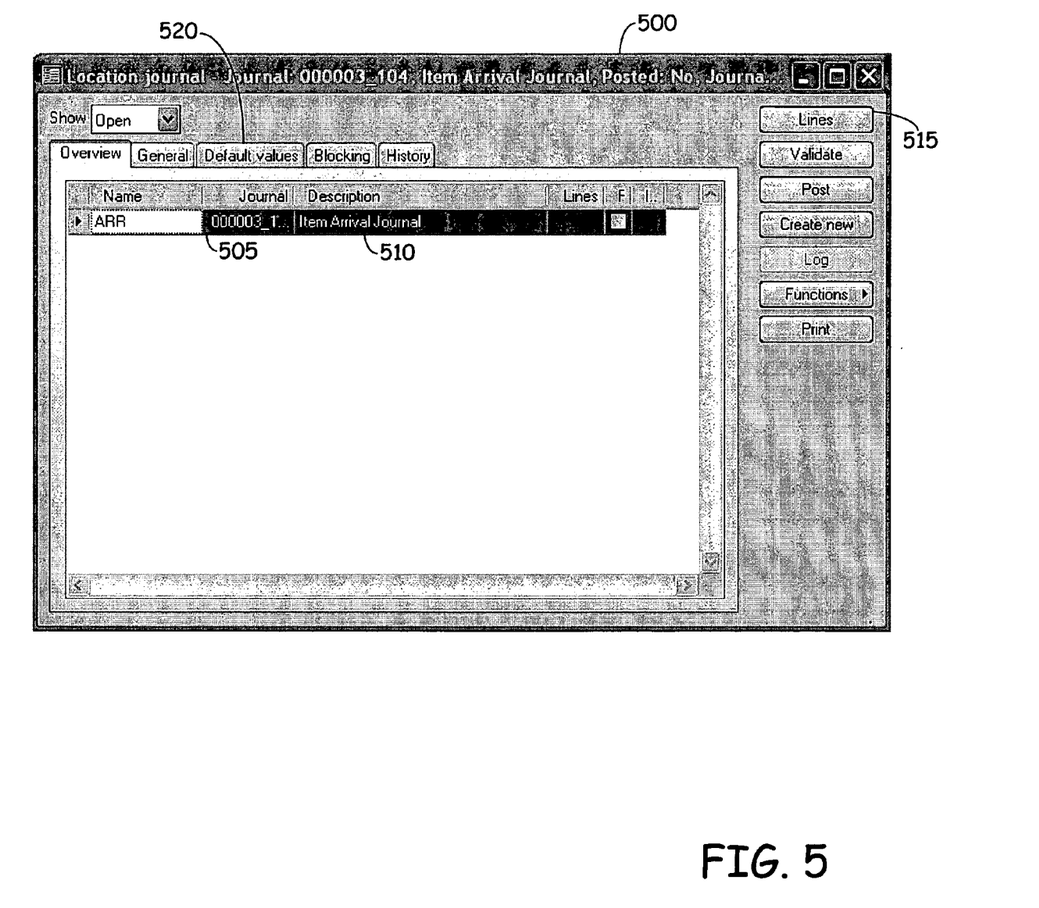
FIG. 5 is a screen shot of an example embodiment of an arrival form used in the present invention.

Next, the ERP system registration steps are described. As shown at step 425, an item arrival journal, and lines within the journal are created. The item arrival journal is created by calling an item arrival form. A screenshot depicting an example embodiment of arrival form 500 is provided in FIG. 5. A form in this context, including arrival form 500, is a window, a dialog, a page, or another UI element for viewing and/or entering data. In addition to a graphical user interface (GUI), forms include form logic which controls the mapping of data from a table or object to a field, text box, etc. on the GUI. The data mapping logic can also include data transformation logic which, for example, converts data from one format to another.

Figure 6:
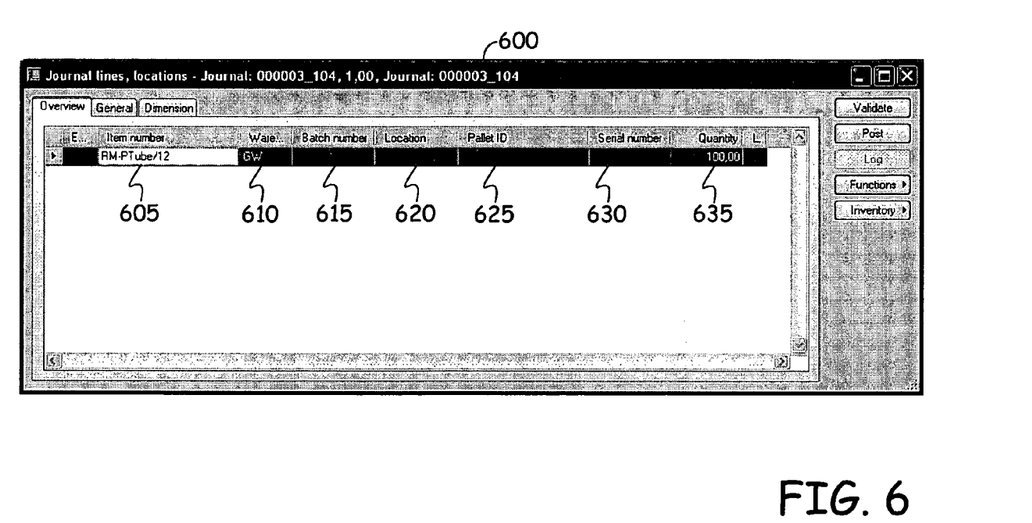
FIG. 6 is a screen shot of an example embodiment of an arrival lines form used in the present invention.
Figure 7:
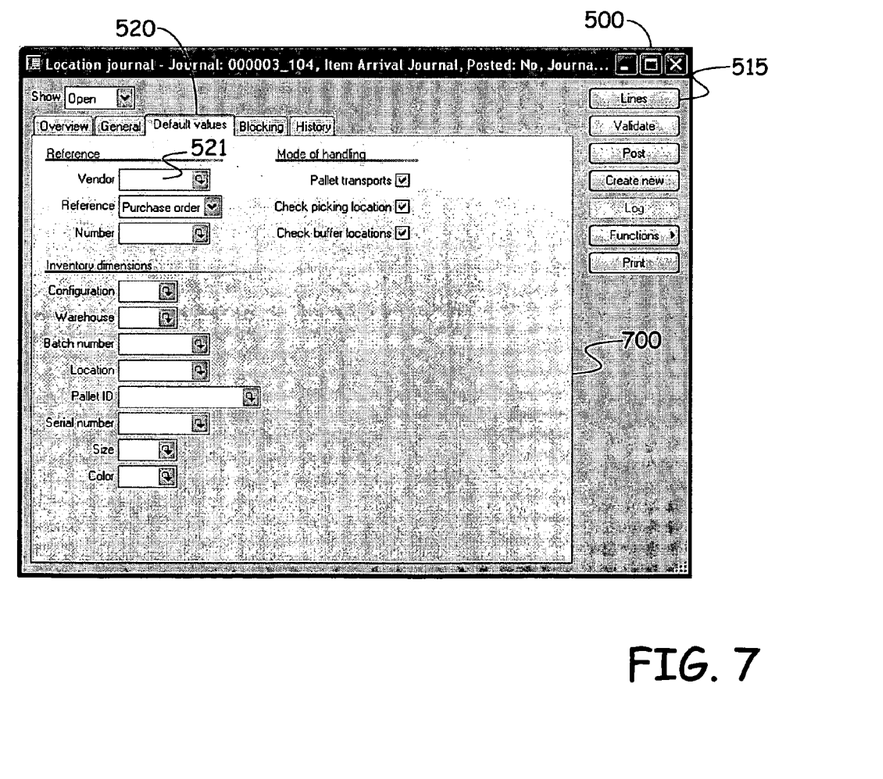
FIG. 7 is a screen shot of an example embodiment of a default values form used in the present invention.

Arrival form 500 includes a journal ID display field or portion 505 which displays an ID or name for the arrival journal, and in the case of creation of a new journal, allows the journal ID to be entered. A description field or portion 510 displays a description for the journal, for example a name. Arrival form 500 also includes a number of input control elements, for example in the form of buttons, tabs, check boxes, etc. In arrival form 500, a lines button 515 can be selected using an input device to call a lines form 600 as shown in the example screen shot of FIG. 6. Using lines form 600, item arrival lines can be created manually using information delivered together with the items (information like vendor number/name, purchase order number, item number etc.) For this purpose, default values are used in arrival form 500 (using "Default values" screen 700 shown in FIG. 7 which is accessible using tab 520). As an example, the Vendor number can be entered in a vendor field 521. Then, clicking on or selecting the button Function/create lines (lines button 515), results in the return of all outstanding deliveries from this vendor. The user must then select the line valid for this delivery. This process creates the item arrival lines. Selection/mapping criteria and methods, discussed further below in connection with mapping form 800 of FIG. 8, can also be used to select the ordered items. Arrival journal lines contain descriptive data, but essentially provide a list of ordered items.

Lines form 600 includes descriptive fields or portions such as item number field 605, warehouse field 610, batch number field 615, location field 620, pallet ID field 625, serial number field 630 and quantity field 635. Where applicable, the data for these fields is automatically mapped from purchase orders to lines form 600. Lines are also created "manually", as represented in step 425 by the phrase "manual process." As described above, this manual process utilizes, if known, details of the items received as default values entered in default values screen 700 shown in FIG. 7. As can be seen, these default values can correspond to the descriptive fields shown in FIG. 6.

Figure 8:
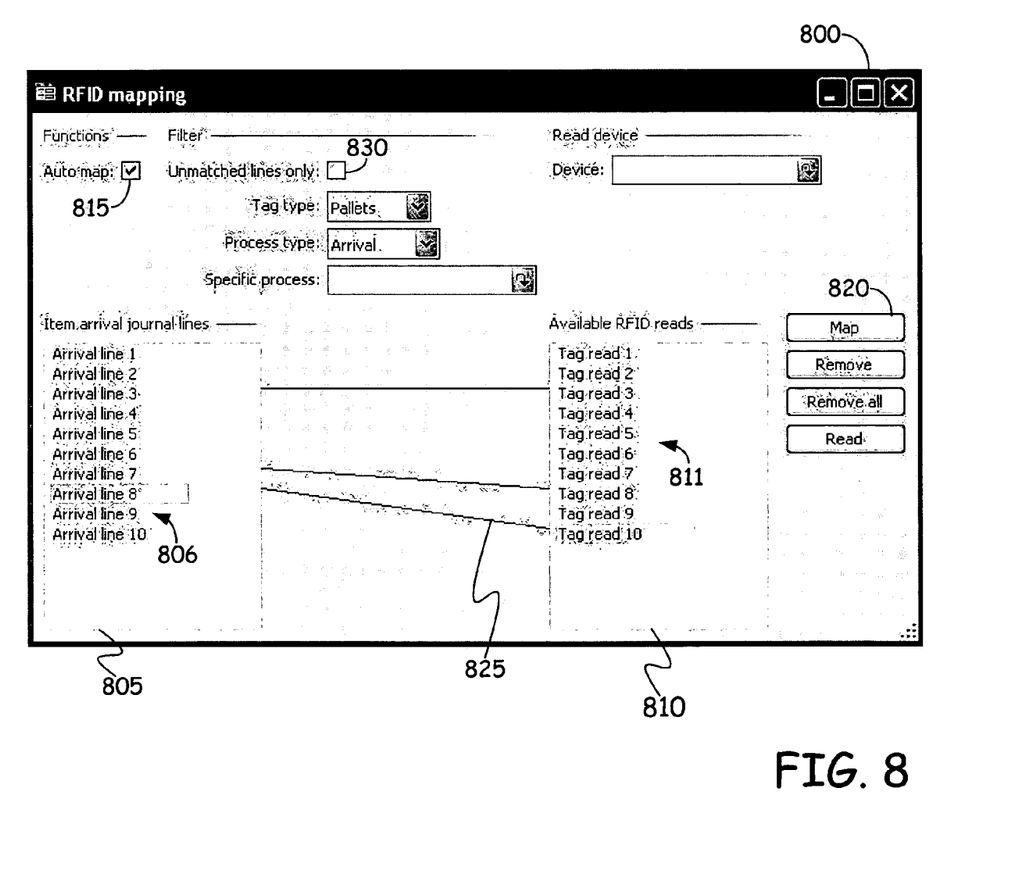
FIG. 8 is a screen shot of an example embodiment of a mapping form used in the present invention.

Referring back to FIG. 4, shown at 430 is a step of calling a match or mapping form. A screen shot depicting an example embodiment of the mapping form 800 is shown in FIG. 8. In the mapping form, the created item arrival journal lines 806 are inserted and displayed in a first window 805 on a left side of the form, and the RFID tag reads or EPC lines 811 (i.e., the items identified by the decrypted EPC number components-such as GTIN numbers-from the EPC table) are displayed in a second window 810 on a right side of the form. With the arrival lines 806 and the GTIN or other information shown in windows 805 and 810, logic components of mapping form 800 can be used to automatically or manually match or map the arrival lines 806 to the EPC lines 811. This step is shown at 435 of FIG. 4. For example, if "Auto map" check box 815 is selected the form logic to automatically match the received items (represented by EPC lines 811) to the ordered items (represented by arrival lines 811) using one or more criteria. For example, the GTIN number which is assigned to the item number will typically be used. If there is more than on possible "map", the first EPC number will typically be mapped to the first item arrival that holds an item number with the right GTIN number. Then the second EPC will be treated the same, with the selection of the first suitable line. These mappings or matches are represented in mapping form 800 by connecting lines 825 extending between individual lines 806 and individual lines 811.

Figure 10:
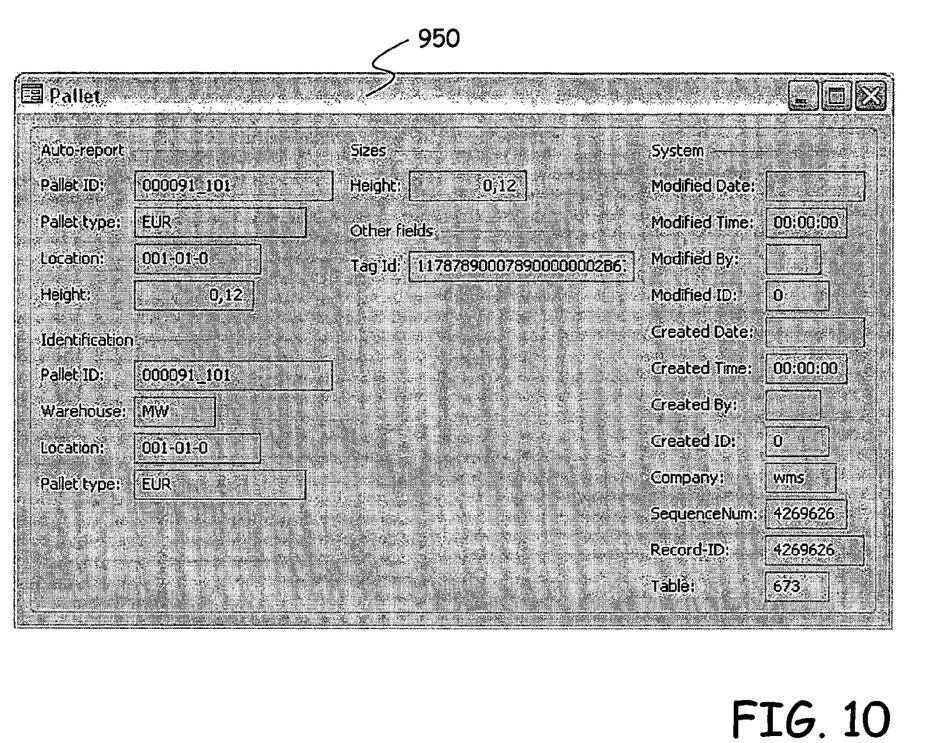
FIG. 10 is a screen shot of an example embodiment of a pallet table.

Although mapping form 800 facilitates automatic mapping as described, there is also a manual component to the mapping process when necessary or desired. This manual mapping is also carried out using mapping form 800. If the system cannot determine which arrival line 806 a particular EPC line 811 should map to (for example due to multiple orders, conflicting quantities, partially filled orders, etc), manually mapping can be carried out. To create a manual mark the user has to select one of the item arrival lines in the mapping form, then select one of the tag reads and finally select the "Map" button 820. If check box 830 is selected, only unmatched lines will be available for manual mapping. Otherwise, if check box 830 is not selected, the automatic mappings can be overridden and manual mapping can be effected. When the mapping is complete, the EPC numbers are inserted on the pallet table. With the selection of a button such as an "OK" or "Apply" button, the match or mapping data is saved, as indicate at step 440. The EPC number is saved into the pallet table 950 shown in FIG. 10. This is indicated at step 442 in FIG. 4.

The pallet or container ID is either created upfront, before the mapping from is activated, or it is automatically generated when the OK/Apply button is activated. When saving the data, the pallet or container ID is saved into a corresponding field (i.e., Pallet ID field 625 shown in FIG. 6) on the appropriate item arrival lines, if none was already present. This is illustrated in FIG. 4 at step 445. When an OK/Apply command is given, the tag-read is linked to the Pallet ID in Pallet table 950 shown in FIG. 10. As noted, if no pallet ID has been assigned to the item arrival line, the ERP system automatically generates one and inserts it into the item arrival line. ERP system 200 can then post the arrival journal as a record of the now registered received items. This is illustrated in FIG. 4 at step 450.

Figure 9:
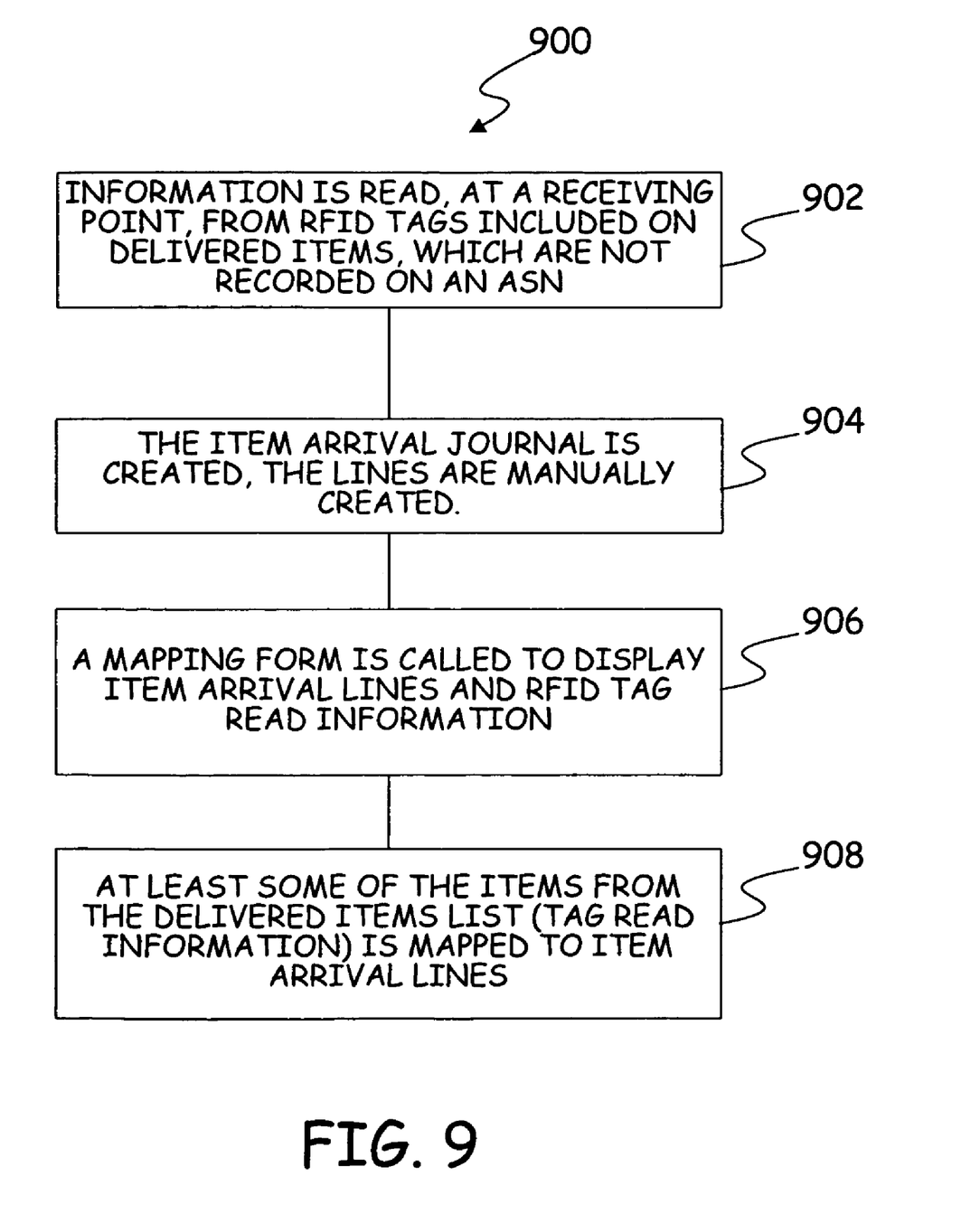
FIG. 9 is a flowchart showing steps of a RFID receiving method for use ERP system in accordance with an embodiment of the present invention.

FIG. 9 is a flowchart 900 showing steps of a RFID receiving method for use ERP system in accordance with an embodiment of the present invention. At step 902, information is read, at a receiving point, from RFID tags included on delivered items, which are not recorded on an ASN. At step 904, a delivered items list is built based on the information read from the RFID tags. At step 906, a mapping form is called to display item arrival lines and tag read information (delivered items list). At step 908, logic of the mapping form automatically maps the tag read information (delivered items) to the item arrival lines. Different techniques, some of which are set forth above, can be employed to carry out the steps shown in the above flowchart while maintaining substantially the same functionality without departing from the scope and spirit of the present invention.

Although the present invention has been described with reference to particular embodiments, workers skilled in the art will recognize that changes may be made in form and detail without departing from the spirit and scope of the invention.

What is claimed is:

1. A computer implemented method for automatically mapping shipment data, the method comprising:
    reading, at a receiving point, information from Radio Frequency Identification (RFID) tags included on delivered items for which no Advanced Shipment Notification (ASN) has been received;
    calling an item arrival form, the item arrival form being displayed on a graphical user interface and including a plurality of input control elements, the plurality of input control elements including a lines button and a post button;
    receiving a selection of the lines button;
    calling, based on the selection of the lines button, a lines form, the lines form being displayed on the graphical user interface and including an item number field, a location field, and a quantity field;
    receiving selection of ordered items from a purchase orders database included in an ERP system to create an item arrival journal;
    automatically mapping data from the purchase orders to one or more of the fields in the lines form to create item arrival lines;
    communicating with an Enterprise Resource Planning (ERP) server computer upon which the ERP system operates to call a mapping form to be displayed on the graphical user interface, the mapping form including a first window and a second window, the first window displaying the item arrival lines and the second window displaying the RFID tag information indicative of the delivered items for which no ASN has been received, and wherein the mapping form also includes a remove button, a read button, a tag type box, a process type box, and a device box;
    using, based upon a selection of the map box, the ERP server computer to automatically map, using mapping form logic which includes criteria for mapping, the delivered items, for which no ASN has been received, with the item arrival lines based on a Global Trading Identification Number (GTIN); and
    saving the automatically mapped data to a pallet table.

2. The method of claim 1, wherein reading information from the RFID tags comprises:
    identifying an encrypted Electronic Product Code (EPC) number in each of the RFID tags, each EPC number having a header field, a manager number field, an object class field, and a serial number field; and
    decrypting the identified EPC number to obtain information included in the EPC number.

3. The method of claim 2, wherein the header field identifies a length, a type, a structure, a version, and a generation of the EPC number, wherein the manager number field identifies a company, wherein the object class identifies a Global Trading Identification Number (GTIN), and wherein the serial number field identifies a specific instance of the object class.

4. The method of claim 1 wherein reading information from the RFID tags further comprises storing information read from each of the RFID tags in a table included in the ERP system.

5. The method of claim 1, wherein the item arrival form further includes a journal ID display field, a description field, and wherein the plurality of input control elements further includes a validate button, a new button, a log button, a functions button, and a print button.

6. The method of claim 5, wherein the lines form further includes a warehouse field, a batch field, a batch number field, a pallet ID field, and a serial number field.

7. The method of claim 6, further comprising:
    manually mapping data to a second one or more of the fields in the lines form.

8. The method of claim 6, further comprising:
    creating a pallet ID for the pallet table before the automatic mapping is performed.

9. The method of claim 6, further comprising:
    creating a pallet ID for the pallet table upon an activation of an OK/Apply button.

10. The method of claim 1, wherein the pallet table includes a pallet ID field, a pallet type field, a location field, and a tag ID field.

11. The method of claim 1, wherein the lines form further includes a validate button, a post button, a log button, a functions button, and an inventory button.

12. The method of claim 1, further comprising:
    displaying on the graphical user interface a default values interface, the default values interface including a vendor drop down box and a post button.

* * * * *

UNITED STATES PATENT AND TRADEMARK OFFICE
CERTIFICATE OF CORRECTION

| | | |
|---|---|---|
| PATENT NO. | : 7,707,064 B2 | Page 1 of 1 |
| APPLICATION NO. | : 11/101062 | |
| DATED | : April 27, 2010 | |
| INVENTOR(S) | : Flemming Gregersen et al. | |

It is certified that error appears in the above-identified patent and that said Letters Patent is hereby corrected as shown below:

In column 2, line 46, delete "integration" and insert -- integrating --, therefor.

In column 2, line 47, delete "will" and insert -- well --, therefor.

In column 9, line 3, delete "indicate" and insert -- indicated --, therefor.

Signed and Sealed this
Seventeenth Day of May, 2011

David J. Kappos
*Director of the United States Patent and Trademark Office*